United States Patent
Zhao et al.

(10) Patent No.: US 10,671,201 B2
(45) Date of Patent: Jun. 2, 2020

(54) TOUCH SUBSTRATE, TOUCH DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Bin Zhao, Beijing (CN); Pengju Zhang, Beijing (CN); Jian Li, Beijing (CN); Hanqing Liu, Beijing (CN); Xuchen Yuan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 202 days.

(21) Appl. No.: 15/210,086

(22) Filed: Jul. 14, 2016

(65) Prior Publication Data

US 2017/0220168 A1 Aug. 3, 2017

(30) Foreign Application Priority Data

Feb. 1, 2016 (CN) .......................... 2016 1 0069575

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04105* (2013.01)

(58) Field of Classification Search
None
See application file for complete search history.

(56) References Cited

U.S. PATENT DOCUMENTS 8,031,275 B2 * 10/2011 Lee .................... G02F 1/13338
178/18.01
2008/0018611 A1    1/2008 Serban et al.
(Continued)

FOREIGN PATENT DOCUMENTS

| CN | 102103451 A | 6/2011 |
| CN | 102804116 A | 11/2012 |
| CN | 104598066 A | 5/2015 |

OTHER PUBLICATIONS

First Office Action dated Feb. 1, 2018 corresponding to Chinese application No. 201610069575.8.

*Primary Examiner* — Brian M Butcher
(74) *Attorney, Agent, or Firm* — Nath, Goldberg & Meyer; Joshua B. Goldberg (57) ABSTRACT

A touch substrate comprises a first substrate, a second substrate, a first conductive layer and a second conductive layer. When the second substrate is not subjected to a pressure, the second conductive layer is insulatively spaced apart from the first conductive layer; when the second substrate is subjected to a pressure equal to or greater than a predetermined value, the second substrate is deformed so that at least a part of the second conductive layer is contacted with the first conductive layer. A touch display panel and a display device which comprise the touch substrate are also provided.

18 Claims, 4 Drawing Sheets

(56) References Cited

U.S. PATENT DOCUMENTS

2015/0116073 A1* 4/2015 Suzuki .............. H03K 17/9647
  338/47
2015/0301660 A1* 10/2015 Watazu .................. G06F 3/045
  345/173

* cited by examiner

TOUCH SUBSTRATE, TOUCH DISPLAY PANEL AND DISPLAY DEVICE

CROSS-REFERENCE TO RELATED APPLICATION

This application claims priority to Chinese Patent Application No. 201610069575.8 filed on Feb. 1, 2016, the contents of which are incorporated by reference in the entirety.

TECHNICAL FIELD

The present invention relates to the field of display technology, and particularly relates to a touch substrate, a touch display panel and a display device.

BACKGROUND

Currently, the most widely used touch display panel is a capacitive touch display panel. The capacitive touch display panel supports multi-point touch control function, and has advantages of high touch sensitivity, high transmittance, low total power consumption, high hardness of contact surface, no need of pressing down, and long service time. However, the capacitive touch display panel can detect only a touch action of a conductive body on the touch display panel, but cannot detect the pressure on the touch display panel applied by the touch action. Accordingly, functions of a touch device are restricted to a certain extent. For example, if a user wants to invoke a function in a touch screen phone, he/she must enter the menu level by level to enter the desired functional interface, resulting in a cumbersome operation.

SUMMARY

An object of the invention is to provide a touch substrate, a touch display panel and a display device which is capable of achieving touch sensing and pressure sensing simultaneously with a simple structure so as to achieve more functions by simpler operations.

In order to achieve the above object, embodiments of the invention provide a touch substrate, comprising a first substrate, a second substrate, a first conductive layer and a second conductive layer, wherein the first substrate and the second substrate are opposed to each other, the first conductive layer is disposed on a surface of the first substrate facing to the second substrate, the second conductive layer is disposed on a surface of the second substrate facing to the first substrate, and when the second substrate is not subjected to a pressure, the second conductive layer is insulatively spaced apart from the first conductive layer; when the second substrate is subjected to a pressure equal to or greater than a predetermined value, the second substrate is deformed so that at least a part of the second conductive layer is contacted with the first conductive layer.

Optionally, the touch substrate is divided to a display area and a non-display area surrounding the display area, a support member is disposed between the first conductive layer and the second conductive layer so as to form a gap therebetween, the support member is at least insulatively contacted with one of the first conductive layer and the second conductive layer, and the support member is disposed in the non-display area.

Optionally, the second conductive layer comprises a plurality of conductive parts insulatively spaced apart from each other.

Optionally, the plurality of conductive parts are arranged in rows and columns.

Optionally, the plurality of conductive parts comprise a center conductive part and multiple annular conductive parts, which are mutually insulated, each of the annular conductive parts is arranged to encircle the center conductive part, inner diameters of the annular conductive parts are different from each other, and for any one of the annular conductive parts, other annular conductive parts having smaller inner diameters than that of this annular conductive part are disposed between the center conductive part and this annular conductive part.

Optionally, the first conductive layer and the second conductive layer are formed by a transparent conductive material.

Optionally, the touch substrate further comprises a plurality of touch driving electrodes and a plurality of touch sensing electrodes which are disposed at a side of the second substrate far away from the first substrate, the touch driving electrodes being insulatively spaced apart from the touch sensing electrodes.

Optionally, each of the touch driving electrodes and the touch sensing electrodes is a strip electrode; each of the touch driving electrodes is extended along a first direction, and the touch driving electrodes are arranged along a second direction intersecting with the first direction; and each of the touch sensing electrodes is extended along the second direction, and the touch sensing electrodes are arranged along the first direction.

Optionally, the touch substrate further comprises a cover plate opposite to the second substrate, the touch driving electrodes and the touch sensing electrodes being disposed between the cover plate and the second substrate.

Embodiments of the invention further provide a touch display panel, comprising a touch substrate and a display panel fixedly connected to the touch substrate, the touch substrate is the touch substrate described above.

Optionally, the display panel comprises an array substrate and an opposition substrate which are opposite to each other, the opposition substrate and the first substrate are formed as a whole, and the second substrate is disposed at a side of the first substrate far away from the array substrate.

Embodiments of the invention further provide a display device, comprising a touch display panel, a signal source and a detection module, wherein the touch display panel comprises a touch substrate and a display panel fixedly connected to the touch substrate, the touch substrate is the touch substrate according to an embodiment of the invention; an input of the signal source is connected to one of the first conductive layer and the second conductive layer, and an output of the signal source is connected to the other one of the first conductive layer and the second conductive layer; and the detection module is connected between the first conductive layer and the signal source or between the second conductive layer and the signal source, and the detection module is configured to detect whether current flows between the first conductive layer and the second conductive layer.

Optionally, the second conductive layer comprises a plurality of conductive parts insulatively spaced apart from each other, the output of the signal source comprises a plurality of output terminals which correspond to the plurality of conductive parts in a one-to-one manner, each of the conductive parts is connected to a corresponding one of the output terminals, the first conductive layer is connected to the input of the signal source, and the detection module is capable of detecting a magnitude of the current flowing between the first conductive layer and the second conductive layer.

Optionally, the touch substrate further comprises a plurality of touch driving electrodes and a plurality of touch sensing electrodes which are disposed at a side of the second substrate far away from the first substrate, the touch driving electrodes being insulatively spaced apart from the touch sensing electrodes;

the display device further comprises a touch control circuit, the touch control circuit being configured to apply a touch driving signal to the plurality of touch driving electrodes in order and receive electrical signals sensed at the touch sensing electrodes.

Optionally, each of the touch driving electrodes and the touch sensing electrodes is a strip electrode;

each of the touch driving electrodes is extended along a first direction, and the touch driving electrodes are arranged along a second direction intersecting with the first direction; and each of the touch sensing electrodes is extended along the second direction, and the touch sensing electrodes are arranged along the first direction.

In the present invention, when the second substrate in the touch substrate is not touched, the first conductive layer is insulatively spaced apart from the second conductive layer, and the detection module in the display device detects that there is no current flowing between the first conductive layer and the second conductive layer. When the second substrate is touched and the touch pressure is equal to or greater than a predetermined value, the touch pressure applied to the display device causes the portion of the second conductive layer corresponding to the touch position to contact with the first conductive layer so that an electrical connection is formed therebetween, and the detection module detects that there is current flowing between the first conductive layer and the second conductive layer, thereby determination that the touch pressure is equal to or greater than the predetermined value is made. In this case, more functions can be achieved by using the touch pressure. For example, an operation performed in a case that the touch pressure is smaller than the predetermined value is different from an operation performed in a case that the touch pressure is equal to or greater than the predetermined value. Moreover, in a case that the second conductive layer comprises a plurality of conductive parts, the detection module in the display device may detect the magnitude of the current between the first conductive layer and the second conductive layer so that different touch pressures may be recognized from different currents so that different operations may be performed. Accordingly, when a user is looking up an option for an operation, it is unnecessary for him/her to find out the option for the operation by entering the menu level by level. The user may rapidly invoke the operational option by, for example, increasing the touch pressure, which is a convenient operation for the user.

BRIEF DESCRIPTION OF THE FIGURES

For better understanding of the invention, the drawings which constitute a part of the specification are provided so as to illustrate the invention in conjunction with the following specific embodiments, and are not intended to limit the scope of the invention. In the drawings.

DETAILED DESCRIPTION

The specific embodiments of the present invention will be described in detail below using the accompanying drawings. It is to be noted that the embodiments are presented herein for purpose of illustration and description only, and are not intended to limit the scope of the present invention.

Figure 1:
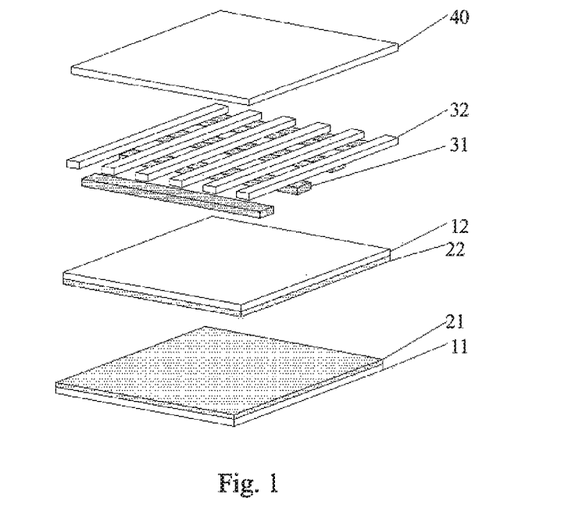
FIG. 1 is a schematic exploded view of the structure of a touch substrate according to an embodiment of the invention.

As an aspect of the invention, a touch substrate is provided. As shown in FIG. 1, the touch substrate comprises a first substrate 11, a second substrate 12, a first conductive layer 21 and a second conductive layer 22. The first substrate 11 and the second substrate 12 are opposed to each other, the first conductive layer 21 is disposed on a surface of the first substrate 11 facing to the second substrate 12, the second conductive layer 22 is disposed on a surface of the second substrate 12 facing to the first substrate 11. When the second substrate 12 is not subjected to a pressure, the second conductive layer 22 is insulatively spaced apart from the first conductive layer 21; when the second substrate 12 is subjected to a pressure equal to or greater than a predetermined value, the second substrate 12 is deformed so that at least a part of the second conductive layer 22 is contacted with the first conductive layer 21.

In embodiments of the invention, the predetermined value is dependent on the material of the second substrate 12. When the second substrate 12 is touched by a touch pressure with a certain value, the portion of the second substrate 12 corresponding to the touch position is just capable of contacting with the first substrate 11, and such certain value is the predetermined value. The smaller the rigidity of the second substrate 12 is, the smaller the predetermined value is. The larger the rigidity of the second substrate 12 is, the larger the predetermined value is.

Figure 2:
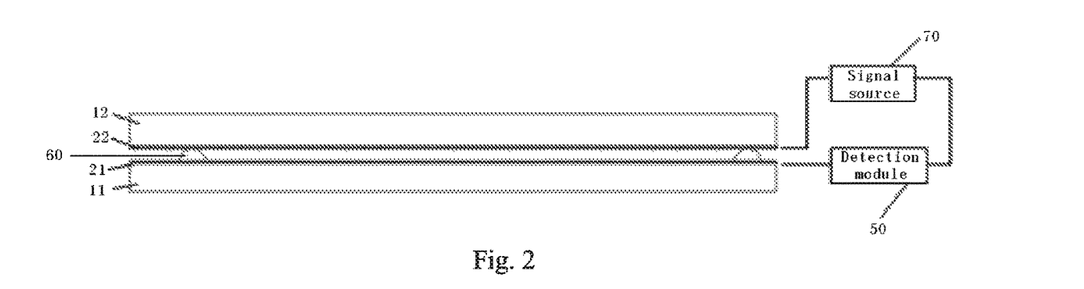
FIG. 2 is a schematic diagram of a state of a second substrate when it is not touched in a case that a second conductive layer is a continuous film.
Figure 3:
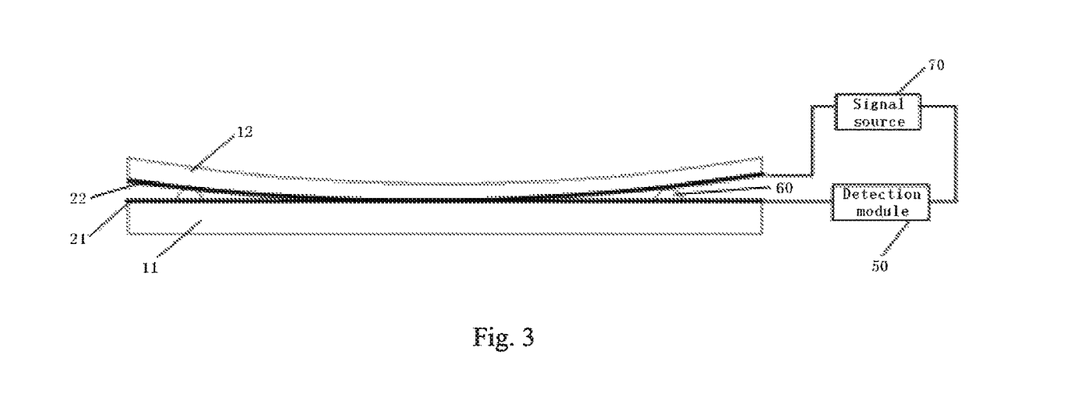
FIG. 3 is a schematic diagram of a state of the second substrate when it is touched in the case that the second conductive layer is a continuous film.

The touch substrate of the embodiment of the invention may be applied into a touch display device. When the second substrate 12 is not subjected to a touch, there is a gap between the second conductive layer 22 and the first conductive layer 21 so that the second conductive layer 22 and the first conductive layer 21 are insulatively spaced apart from each other (as shown in FIG. 2). When the second substrate 12 is subjected to a touch pressure equal to or larger than the predetermined value, the second conductive layer 22 is deformed to contact with the first conductive layer 21 (as shown in FIG. 3). Consequently, whether the second conductive layer 22 is contacted with the first conductive layer 21 may be determined by applying an electrical signal to the first conductive layer 21 and the second conductive layer 22 and detecting whether there is current flowing therebetween, so as to determine whether the touch pressure reaches the predetermined value.

In the touch display device including the touch substrate, other structures capable of detecting the touch position, such as touch driving electrodes, touch sensing electrodes, and so on, may also be included. The touch substrate in the embodiment of the invention may be combined with the structure for detecting the touch position so that the touch display device can not only determine the touch position but also judge whether the touch pressure reaches the predetermined value, without a complex structure. Accordingly, in the touch display device including the touch substrate, more functions may be achieved based on the combination of the touch position and the touch pressure. For example, in the touch display device, at a same touch position, an operation corresponding to a case that the touch pressure is smaller than the predetermined value may be different from an operation corresponding to a case that the touch pressure is equal to or larger than the predetermined value. Thus, when a user is looking up an option for a specific operation, he/she needn't find the option for the operation, which is the target, by entering the menu level by level, but can rapidly invoke the target operational option by controlling (e.g., increasing) the touch pressure. It is a convenient operation for the user.

The input of the signal source 70 is connected to one of the first conductive layer 21 and the second conductive layer 22. The output of the signal source 70 is connected to the other one of the first conductive layer 21 and the second conductive layer 22. The signal source 70 is used for generating an electrical signal. The detection module 50 is connected between the first conductive layer 21 and the signal source 70 or between the second conductive layer 22 and the signal source 70. The detection module 50 is used for detecting whether current flows between the first conductive layer 21 and the second conductive layer 22.

In order that the first conductive layer 21 and the second conductive layer 22 are insulatively spaced apart from each other when the second substrate 12 is not subjected to a pressure, and a part of the second conductive layer 22 is contacted with the first conductive layer 21 when the second substrate 12 is subjected to a pressure equal to or greater than the predetermined value, specifically, as shown in FIGS. 2, 3, 7-9, a support member 60 is provided between the first conductive layer 21 and the second conductive layer 22 so as to form a gap therebetween. The support member 60 is at least insulatively contacted with one of the first conductive layer 21 and the second conductive layer 22. The touch substrate is divided to a display area and a non-display area surrounding the display area, and the support member 60 may located at the non-display area. When the second substrate 12 is not subjected to a pressure, the second conductive layer 22 is insulatively spaced apart from the first conductive layer 21 by the gap therebetween. When any position in the display area is touched and the touch pressure reaches the predetermined value, the portion of the second conductive layer 22 that is pressed is contacted with the first conductive layer 21. In an example, in the display device including the touch substrate, one of the first conductive layer 21 and the second conductive layer 22 may be connected to the input of the signal source 70, and the other one may be connected to the output of the signal source 70. When the portion of the second conductive layer 22 that is pressed is contacted with the first conductive layer 21, a current path is formed between the signal source 70, the first conductive layer 21 and the second conductive layer 22. The current flowing between the first conductive layer 21 and the second conductive layer 22 may be detected by the detection module 50.

Figure 4:
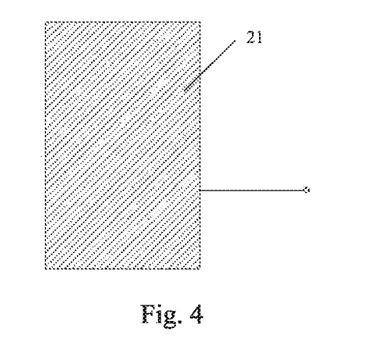
FIG. 4 is a schematic diagram of a structure of a first conductive layer.
Figure 7:
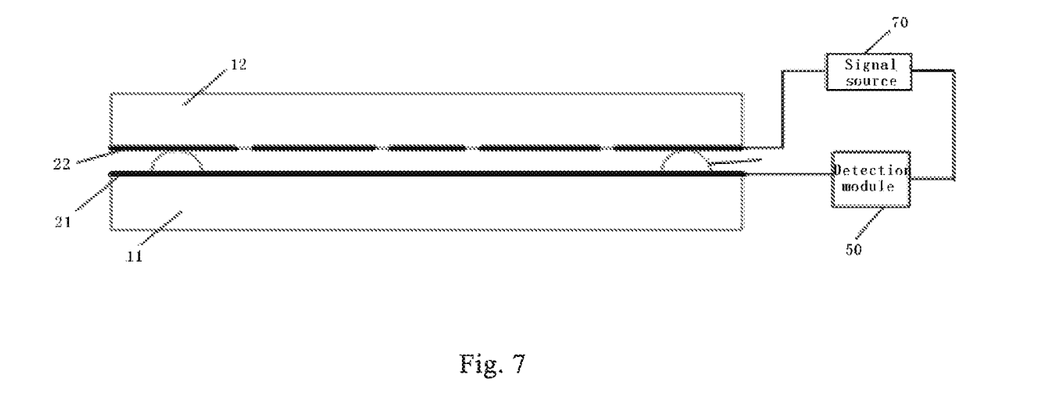
FIG. 7 is a schematic diagram of a state of the second substrate when it is not touched according to an embodiment of the invention.
Figure 8:
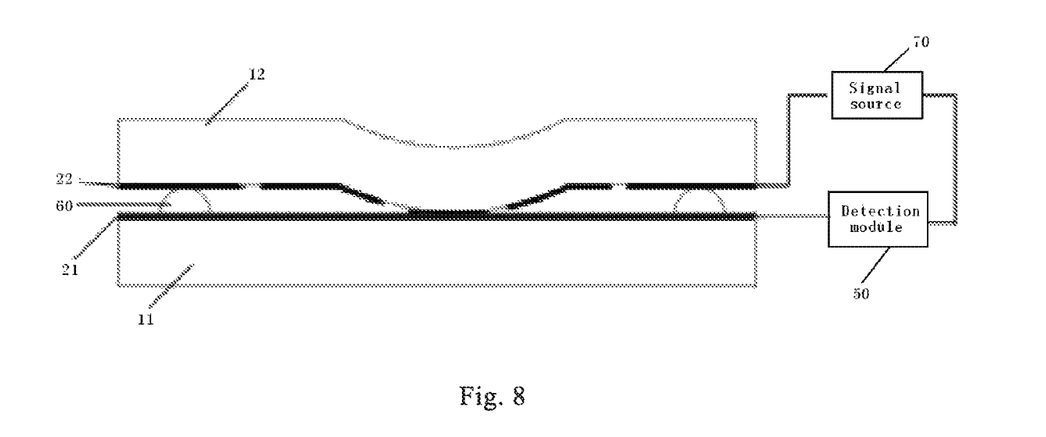
FIGS. 8 and 9 are schematic diagrams of the states of the second substrate when it is subjected to different touch pressures, respectively.
Figure 9:
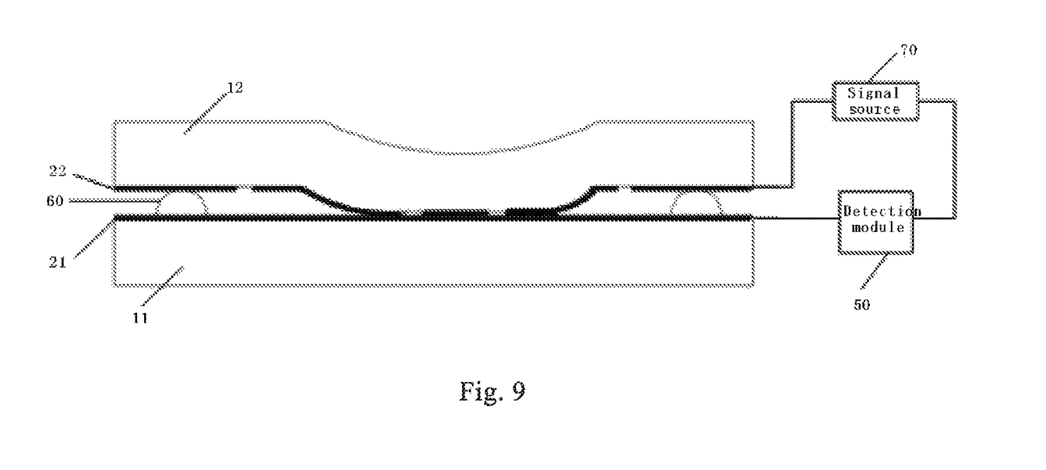

The first conductive layer 21 may be a continuous film (as shown in FIG. 4), and the second conductive layer 22 may have the same structure as that of the first conductive layer 21 (as shown in FIGS. 2 and 3). In this case, by connecting the first conductive layer 21 and the second conductive layer 22 respectively to the signal source 70 used for providing an electrical signal, and detecting whether there is current flowing between the first conductive layer 21 and the second conductive layer 22, it may be determined whether the touch pressure is equal to or greater than the predetermined value. In order to further distinguish high touch pressure and low touch pressure, optionally, the second conductive layer 22 includes a plurality of conductive parts 22a which are insulatively spaced apart from each other. As shown in FIG. 7, when the second substrate 12 is not subjected to a touch, each conductive part 22a is insulatively spaced apart from the first conductive layer 21. As shown in FIGS. 8 and 9, as the touch pressure is increasing, the degree of bending of the second conductive layer 22 is increasing, and thus the number of the conductive parts 22a brought into contact with the first conductive layer 21 is increasing. Consequently, under different pressures, the current between the first conductive layer 21 and the second conductive layer 22 detected by the detection module 50 has different magnitudes, and thereby the display device may perform different operations according to different magnitudes of current detected by the detection module 50.

Figure 5:
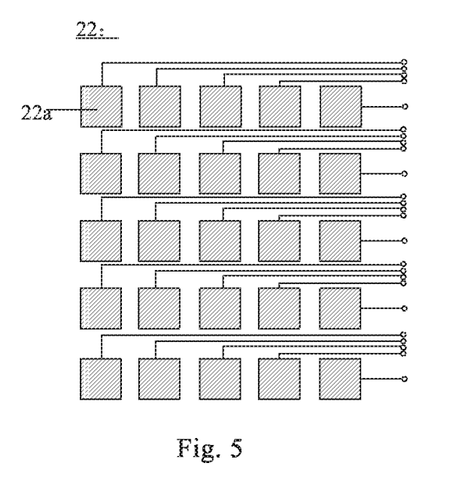
FIG. 5 is a schematic diagram of an exemplary structure of the second conductive layer according to an embodiment of the invention.

The structure and arrangement of the plurality of conductive parts 22a are not limited in the invention, as long as the number of the conductive parts 22a brought into contact with the first conductive layer 21 is increasing along with increasing of the pressure applied to the second substrate 12. As a specific embodiment, the plurality of conductive parts 22a may be arranged in rows and columns, as shown in FIG. 5.

Figure 6:
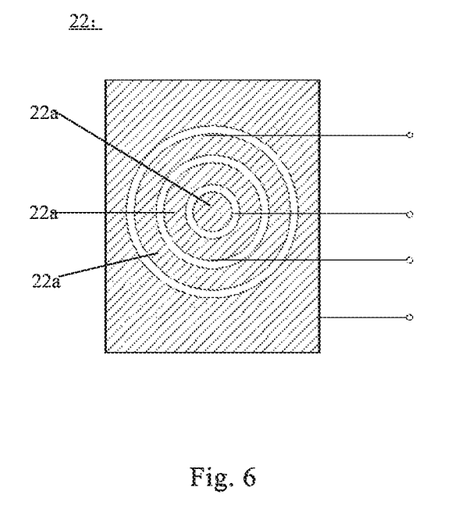
FIG. 6 is a schematic diagram of another exemplary structure of the second conductive layer according to an embodiment of the invention.

As another specific embodiment of the invention, the plurality of conductive part 22a comprises a plurality of annular conductive parts 22a and a center conductive part 22a, which are mutually insulated, as shown in FIG. 6. Each of the annular conductive parts 22a is arranged to encircle the center conductive part 22a, inner diameters of the annular conductive parts 22a are different from each other, and for any one of the annular conductive parts 22a, other annular conductive parts 22a having smaller inner diameters than that of this annular conductive part 22a are disposed between the center conductive part 22a and this annular conductive part 22a. That is, in sequence from the smallest inner diameter to the largest inner diameter, the first annular conductive part 22a surrounds the center conductive part 22a, the second annular conductive part 22a surrounds the first conductive part 22a, and the third annular conductive part 22a surrounds the second conductive part 22a, and so on.

In order not to affect displaying, both of the material for forming the first conductive layer 21 and the material for forming the second conductive layer 22 may be transparent conductive material, such as tin indium oxide (ITO).

In order to determine the touch position, as shown in FIG. 1, the touch substrate further comprises a plurality of touch driving electrodes 31 and a plurality of touch sensing electrodes 32 which are disposed at a side of the second substrate 12 far away from the first substrate 11. Each of the touch driving electrodes 31 and each of the touch sensing electrodes 32 may be a strip electrode. Each of the touch driving electrodes 31 is extended along a first direction, and the plurality of touch driving electrodes 31 are arranged along a second direction intersecting with the first direction. Each of the touch sensing electrodes 32 is extended along the second direction, and the plurality of touch sensing electrodes 32 are arranged along the first direction. In some embodiments, the second direction may be vertical to the first direction.

Figure 11:
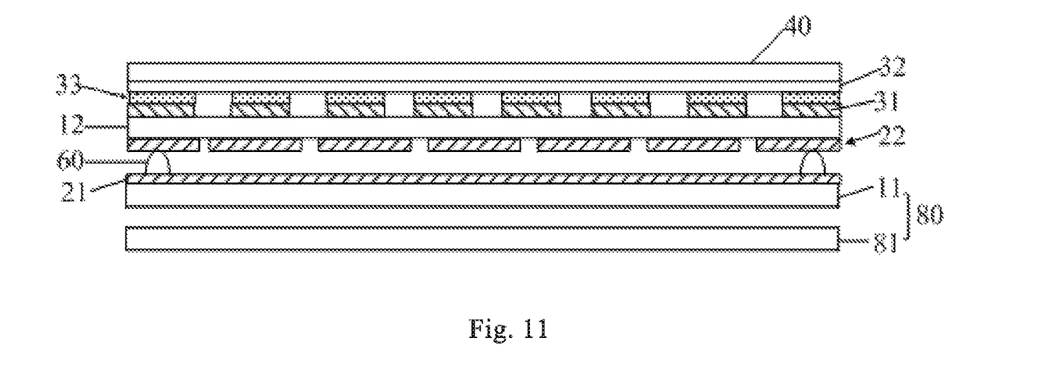
FIG. 11 is a schematic section view of a touch display panel according to an embodiment of the invention.

The touch driving electrodes 31 are insulatively spaced apart from the touch sensing electrodes 32. As shown in FIG. 11, insulation layers 33 may be disposed between the touch driving electrodes 31 and the touch sensing electrodes 32 at the positions where the touch driving electrodes 31 and the touch sensing electrodes 32 intersect with each other. Capacitors are formed between the touch driving electrodes 31 and the touch sensing electrodes 32 at the positions where the touch driving electrodes 31 and the touch sensing electrodes 32 intersect with each other. When a driving signal is received on a touch driving electrode 31, a sensing signal may be generated on the touch sensing electrode 32 which intersects with this touch driving electrode 31. When a touch occurs, phenomenon such as discharging of the electrodes, variation of the distance between the electrodes, and so on, may take place at the touch position, causing a change of the capacitance at the touch position to be changed, and thereby corresponding sensing signal is also changed. Based on the touch driving electrode 31 and the touch sensing electrode 32 corresponding to the touch position at which the sensing signal is changed, the coordinates of the touch position can be determined.

In addition, as shown in FIG. 1, the touch substrate further comprises a cover plate 40 opposite to the second substrate 12. The touch driving electrodes 31 and the touch sensing electrodes 32 are arranged between the cover plate 40 and the second substrate 12.

As another aspect of the invention, a touch display panel is provided. As shown in FIG. 11, the touch display panel comprises a touch substrate and a display panel 80 fixed connected with the touch substrate, wherein the touch substrate is the above touch substrate according to an embodiment of the invention.

Specifically, the display panel 80 comprises an array substrate 81 and an opposition substrate which are opposite to each other. In order to simplify the structure of the touch display panel, as shown in FIG. 11, the opposition substrate and the first substrate 11 may be formed as a whole, that is, the opposition substrate is also used as the first substrate 11. The second substrate 12 is disposed at a side of the first substrate 11 far away from the array substrate 81, that is, the first conductive layer 21 is disposed on the surface of the opposite substrate far away from the array substrate 81.

As another aspect of the invention, a display device comprising the above touch display panel according to an embodiment of the invention is provided. The display device further comprises a signal source 70 and a detection module 50. As shown in FIGS. 2, 3, 7-9, an input of the signal source 70 is connected to one of the first conductive layer 21 and the second conductive layer 22, and an output of the signal source 70 is connected to the other one of the first conductive layer 21 and the second conductive layer 22, The detection module 50 is connected between the first conductive layer 21 and the signal source 22 or between the second conductive layer 22 and the signal source 70, that is, the first conductive layer 21 is indirectly connected to the signal source 70 via the detection module 50, or the second conductive layer 22 is indirectly connected to the signal source 70 via the detection module 50. The detection module 50 is configured to detect whether current flows between the first conductive layer 21 and the second conductive layer 22.

When the second substrate 12 in the touch substrate is not touched, the first conductive layer 21 is insulatively spaced apart from the second conductive layer 22, and the detection module 50 detects that there is no current flowing between the first conductive layer 21 and the second conductive layer 22. When the second substrate 12 is touched and the touch pressure is equal to or greater than a predetermined value, the touch pressure makes the portion of the second conductive layer 22 corresponding to the touch position contact with the first conductive layer 21 so as to form electrical connection therebetween. The detection module 50 detects that there is current flowing between the first conductive layer 21 and the second conductive layer 22. Thus, it is determined that the touch pressure is equal to or greater than the predetermined value. Consequently, more functions may be achieved by using the touch pressure. For example, the operation performed in the case that the touch pressure is smaller than the predetermined value is different from the operation performed in the case that the touch pressure is equal to or greater than the predetermined value. Therefore, when a user is looking up an option for an operation, he/she needn't find out the target operation option by entering the menu level by level, but can rapidly invoke the target operational option by, for example, increasing the touch pressure, resulting in a convenient operation of the user.

Figure 10:
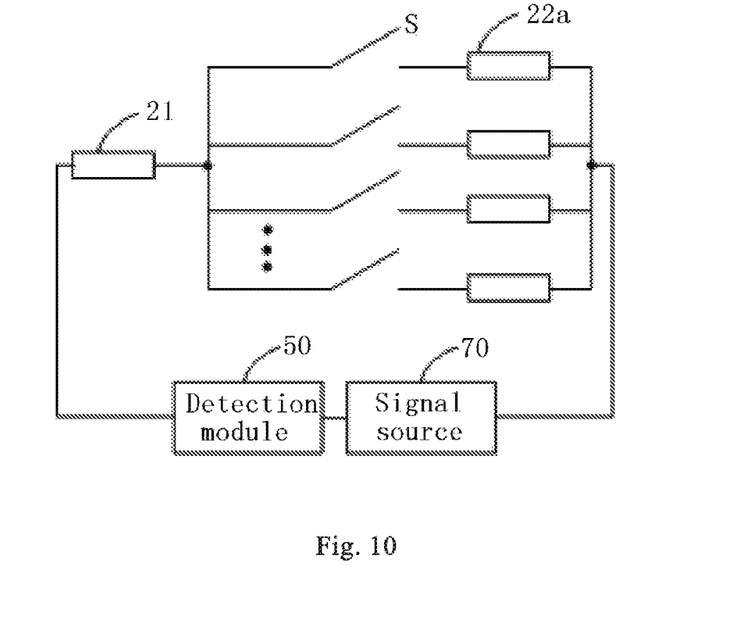
FIG. 10 is a schematic equivalent circuit diagram of a detection module when it is performing current detection according to an embodiment of the invention.

As described above, in order to distinguish small touch pressure and large touch pressure, the second conductive layer 22 may comprise a plurality of conductive parts 22a which are insulatively spaced apart from each other. The output of the signal source 70 comprises a plurality of output terminals which correspond to the plurality of conductive parts 22a in a one-to-one manner. Each of the conductive parts 22a is connected to a corresponding one of the output terminals. The first conductive layer 21 is connected to the input of the signal source 70 via the detection module 50. The detection module 50 is capable of detecting a magnitude of the current flowing between the first conductive layer 21 and the second conductive layer 22. An equivalent circuit diagram for detecting the current is as shown in FIG. 10. A switch S shown in FIG. 10 represents a connecting state between a corresponding conductive part 22a and the first conductive layer 21. A closed switch S represents the state in which the conductive part 11a is contacted with the first conductive layer 21. An open switch S represents the state in which the conductive part 11a is not contacted with the first conductive layer 21. Under different touch pressures, the number of the conductive parts 22a brought into contact with the first conductive layer 21 is different, that is, the number of closed switches in FIG. 10 is different. Thus, the current detected by the detection module 50 is different, and thereby the display device can perform different operations according to different magnitudes of current detected by the detection module 50.

As described above, the touch substrate further comprises a plurality of touch driving electrodes 31 and a plurality of touch sensing electrodes 32 which are disposed at a side of the second substrate 12 far away from the first substrate 11. Each of the touch driving electrodes 31 and each of the touch sensing electrodes 32 may be a strip electrode. Each of the touch driving electrodes 31 is extended along a first direction, and the plurality of touch driving electrodes 31 are arranged along a second direction intersecting with the first direction. Each of the touch sensing electrodes 32 is extended along the second direction, and the plurality of touch sensing electrodes 32 are arranged along the first direction. In some embodiments, the second direction may be vertical to the first direction.

The touch driving electrodes 31 are insulatively spaced apart from the touch sensing electrodes 32. In order to determine coordinates of the touch position, the display device further comprises a touch control circuit (not shown in drawings). The touch control circuit is configured to apply a touch driving signal to the plurality of touch driving electrodes 31 in order (i.e., to perform scanning in order) and receive electrical signals sensed at the touch sensing electrodes 32. Capacitors are formed between the touch driving electrodes 31 and the touch sensing electrodes 32 at the positions where the touch driving electrodes 31 and the touch sensing electrodes 32 intersect with each other. When a driving signal is applied on the touch driving electrode 31, a corresponding sensing signal may be generated on the touch sensing electrode 32 which intersects with this touch driving electrode 31. When a touch occurs, phenomenon such as discharging of the electrodes, variation of the distance between the electrodes, and so on, may take place at the touch position, causing a change of the capacitance at the touch position to be changed, and thereby the corresponding sensing signal is also changed. Accordingly, when a corresponding touch driving electrode 31 is scanned, the sensing signal on the touch sensing electrode 32 corresponding to the touch position may also be changed, and thereby the touch position can be determined.

It could be understood that the above signal source 70, the detection module 50 and the touch circuit may be integrated in a chip. The display device may be a touch screen phone, a tablet computer, etc. the display device may distinguish small touch pressure and large touch pressure to perform different operations while acquiring the touch position information, thereby more functions can be achieved, and it is more convenient for a user to use such a display device.

It could be understood that the above implementations are merely exemplary embodiments adopted for describing the principle of the present invention, but the present invention is not limited thereto. Various variations and improvements may be made by those of ordinary skill in the art without departing from the spirit and essence of the present invention, and these variations and improvements shall also fall into the protection scope of the present invention.

The invention claimed is:

1. A touch substrate, comprising a first substrate, a second substrate, a first conductive layer and a second conductive layer, wherein
the first substrate and the second substrate are opposed to each other,
the first conductive layer is disposed on a surface of the first substrate facing to the second substrate,
the second conductive layer is disposed on a surface of the second substrate facing to the first substrate, and
when the second substrate is not subjected to a pressure, the second conductive layer is insulatively spaced apart from the first conductive layer; when the second substrate is subjected to a pressure equal to or greater than a predetermined value, the second substrate is deformed so that at least a part of the second conductive layer is in electrical contact with the first conductive layer,
wherein the second conductive layer comprises a plurality of conductive parts insulatively spaced apart from each other, the plurality of conductive parts being commonly and directly connected to an output terminal of a same signal source, the first conductive layer is a whole continuous film connected directly to a detection module, and the detection module is configured to detect a magnitude of a current flowing between the first conductive layer and the second conductive layer according to a number of the conductive parts among the plurality of conductive parts that are in electrical contact with the first conductive layer when the second substrate is subjected to the pressure.

2. The touch substrate of claim 1, wherein the touch substrate is divided into a display area and a non-display area surrounding the display area, a support member is disposed between the first conductive layer and the second conductive layer so as to form a gap therebetween, the support member is at least insulatively contacted with one of the first conductive layer and the second conductive layer, and the support member is disposed in the non-display area.

3. The touch substrate of claim 1, wherein the plurality of conductive parts are arranged in rows and columns.

4. The touch substrate of claim 1, wherein the plurality of conductive parts comprise a center conductive part and multiple annular conductive parts, which are mutually insulated, each of the annular conductive parts is arranged to encircle the center conductive part, inner diameters of the annular conductive parts are different from each other, and the annular conductive parts are arranged concentrically around the center conductive part.

5. The touch substrate of claim 1, wherein the first conductive layer and the second conductive layer are formed by a transparent conductive material.

6. The touch substrate of claim 1, further comprising a plurality of touch driving electrodes and a plurality of touch sensing electrodes which are disposed at a side of the second substrate far away from the first substrate, the touch driving electrodes being insulatively spaced apart from the touch sensing electrodes.

7. The touch substrate of claim 6, further comprising a cover plate opposite to the second substrate, the touch driving electrodes and the touch sensing electrodes being disposed between the cover plate and the second substrate.

8. The touch substrate of claim 6, wherein each of the touch driving electrodes and the touch sensing electrodes is a strip electrode;
each of the touch driving electrodes is extended along a first direction, and the touch driving electrodes are arranged along a second direction intersecting with the first direction; and
each of the touch sensing electrodes is extended along the second direction, and the touch sensing electrodes are arranged along the first direction.

9. A touch display panel, comprising a touch substrate and a display panel fixedly connected to the touch substrate, the touch substrate is the touch substrate of claim 1.

10. The touch display panel of claim 9, wherein the display panel comprises an array substrate and an opposition substrate which are opposite to each other, the opposition substrate and the first substrate are formed as a whole, and the second substrate is disposed at a side of the first substrate far away from the array substrate.

11. A display device, comprising a touch display panel, and the signal source and the detection module of claim 1, wherein the touch display panel comprises a touch substrate and a display panel fixedly connected to the touch substrate, the touch substrate is the touch substrate of claim 1.

12. The display device of claim 11, wherein the plurality of conductive parts are arranged in rows and columns.

13. The display device of claim 11, wherein the plurality of conductive parts comprise a center conductive part and multiple annular conductive parts, which are mutually insulated, each of the annular conductive parts is arranged to encircle the center conductive part, inner diameters of the annular conductive parts are different from each other, and the annular conductive parts are arranged concentrically around the center conductive part.

14. The display device of claim 11, wherein the touch substrate further comprises a plurality of touch driving electrodes and a plurality of touch sensing electrodes which are disposed at a side of the second substrate far away from the first substrate, the touch driving electrodes being insulatively spaced apart from the touch sensing electrodes;

the display device further comprises a touch control circuit, the touch control circuit being configured to apply a touch driving signal to the plurality of touch driving electrodes in order and receive electrical signals sensed at the touch sensing electrodes.

15. The display device of claim 14, wherein each of the touch driving electrodes and the touch sensing electrodes is a strip electrode;

each of the touch driving electrodes is extended along a first direction, and the touch driving electrodes are arranged along a second direction intersecting with the first direction; and each of the touch sensing electrodes is extended along the second direction, and the touch sensing electrodes are arranged along the first direction.

16. The display device of claim 11, wherein the touch substrate is divided into a display area and a non-display area surrounding the display area, a support member is disposed between the first conductive layer and the second conductive layer so as to form a gap therebetween, the support member is at least insulatively contacted with one of the first conductive layer and the second conductive layer, and the support member is disposed in the non-display area.

17. The display device of claim 11, wherein the first conductive layer and the second conductive layer are formed by a transparent conductive material.

18. The display device of claim 11, wherein the display panel comprises an array substrate and an opposition substrate which are opposite to each other, the opposition substrate and the first substrate are formed as a whole, and the second substrate is disposed at a side of the first substrate far away from the array substrate.

* * * * *